US012782226B2

(12) United States Patent
Umemoto et al.

(10) Patent No.: US 12,782,226 B2
(45) Date of Patent: Nov. 3, 2026

(54) LEAKAGE DETECTION APPARATUS, SUBSTRATE PROCESSING APPARATUS, SUBSTRATE PROCESSING METHOD, METHOD OF MANUFACTURING SEMICONDUCTOR DEVICE AND NON-TRANSITORY COMPUTER-READABLE RECORDING MEDIUM

(71) Applicant: Kokusai Electric Corporation, Tokyo (JP)

(72) Inventors: Kazuhiro Umemoto, Toyama (JP); Hironobu Shimizu, Toyama (JP)

(73) Assignee: Kokusai Electric Corporation, Tokyo (JP)

( * ) Notice: Subject to any disclaimer, the term of this patent is extended or adjusted under 35 U.S.C. 154(b) by 317 days.

(21) Appl. No.: 18/603,503

(22) Filed: Mar. 13, 2024

(65) Prior Publication Data

US 2024/0219258 A1 Jul. 4, 2024

Related U.S. Application Data

(63) Continuation of application No. PCT/JP2021/048672, filed on Dec. 27, 2021.

(51) Int. Cl.
*G01M 3/28* (2006.01)
*F16L 23/16* (2006.01)
*F16L 23/18* (2006.01)

(52) U.S. Cl.
CPC ......... *G01M 3/2853* (2013.01); *F16L 23/167* (2013.01); *F16L 23/18* (2013.01)

(58) Field of Classification Search
CPC ....... G01M 3/28; G01M 3/2853; F16L 23/16; F16L 23/167; F16L 23/18
See application file for complete search history.

(56) References Cited

U.S. PATENT DOCUMENTS 4,019,371 A * 4/1977 Chaplin ................ F16L 23/167 73/49.8
5,090,871 A * 2/1992 Story ...................... G01M 3/38 417/63

(Continued)

FOREIGN PATENT DOCUMENTS

JP 62-188135 U 11/1987
JP 02-7818 A 1/1990

(Continued)

OTHER PUBLICATIONS

Ozaki et al., Substrate Treating Equipment, Apr. 2008, Espacenet Machine Translation (Year: 2008).*

(Continued)

*Primary Examiner* — Erika J. Villaluna
(74) *Attorney, Agent, or Firm* — Volpe Koenig

(57) ABSTRACT

There is provided a technique that includes: two O-rings arranged between flanges facing each other, wherein the flanges connects pipes and the two O-rings seals an inside of each of the pipes from outside in a double seal manner; a communication hole provided at one of the flanges and communicating with a space surrounded by the two O-rings; a monitor pipe capable of communicating with the communication hole; a pressure gauge connected to the monitor pipe and capable of measuring an inner pressure of the monitor pipe; a valve configured to be capable of being opened and closed to fluidly connect the monitor pipe to an exhaust apparatus; and a controller configured to be capable of controlling an opening and closing operation of the valve so as to maintain a pressure measured by the pressure gauge within a predetermined pressure range lower than inner pressures of the pipes.

16 Claims, 9 Drawing Sheets

(56) References Cited

U.S. PATENT DOCUMENTS

| | | | | |
|---|---|---|---|---|
| 5,578,132 | A | 11/1996 | Yamaga et al. | |
| 6,279,382 | B1 * | 8/2001 | Yatagai | G01M 3/226 73/40.7 |
| 2020/0399759 | A1 * | 12/2020 | Yamazaki | C23C 16/52 |

FOREIGN PATENT DOCUMENTS

| | | | |
|---|---|---|---|
| JP | 04-207019 | A | 7/1992 |
| JP | 07-4509 | U | 1/1995 |
| JP | 07-66145 | A | 3/1995 |
| JP | 07-180027 | A | 7/1995 |
| JP | 07-45094 | U | 12/1995 |
| JP | 3351521 | B2 | 11/2002 |
| JP | 2007-333733 | A | 12/2007 |
| JP | 2008-78505 | A | 4/2008 |
| JP | 2009-242891 | A | 10/2009 |

OTHER PUBLICATIONS

Taiwan Office Action, Taiwan Application No. 111139233, Sep. 14, 2023, 14 pgs.

* cited by examiner

LEAKAGE DETECTION APPARATUS, SUBSTRATE PROCESSING APPARATUS, SUBSTRATE PROCESSING METHOD, METHOD OF MANUFACTURING SEMICONDUCTOR DEVICE AND NON-TRANSITORY COMPUTER-READABLE RECORDING MEDIUM

CROSS-REFERENCE TO RELATED PATENT APPLICATION

This application is a bypass continuation application of PCT International Application No. PCT/JP2021/048672, filed on Dec. 27, 2021, in the WIPO, the entire contents of which are hereby incorporated by reference.

BACKGROUND

1. Field

The present disclosure relates to a leakage detection apparatus, a substrate processing apparatus, a substrate processing method, a method of manufacturing a semiconductor device and a non-transitory computer-readable recording medium.

2. Related Art

According to some related arts, as a part of a manufacturing process of a semiconductor device, a process gas may be flowed (supplied) into a reaction tube where a substrate is processed, and the process gas after the substrate is processed may be discharged (exhausted) by a vacuum pump connected to the reaction tube. In such a case, it is preferable to reduce a gas leakage into a surrounding atmosphere when processing the substrate.

SUMMARY

According to the present disclosure, there is provided a technique capable of reducing a gas leakage when processing a substrate.

According to an aspect of the present disclosure, there is provided a technique that includes: two O-rings arranged between flanges facing each other, wherein the flanges are provided to connect pipes and the two O-rings are provided so as to seal an inside of each of the pipes from outside in a double seal manner; a communication hole provided at one of the flanges and communicating with a space surrounded by the two O-rings; a monitor pipe capable of communicating with the communication hole; a pressure gauge connected to the monitor pipe and capable of measuring an inner pressure of the monitor pipe; a valve configured to be capable of being opened and closed to fluidly connect the monitor pipe to an exhaust apparatus; and a controller configured to be capable of controlling an opening and closing operation of the valve so as to maintain a pressure measured by the pressure gauge within a predetermined pressure range lower than inner pressures of the pipes.

DETAILED DESCRIPTION

Figure 1:
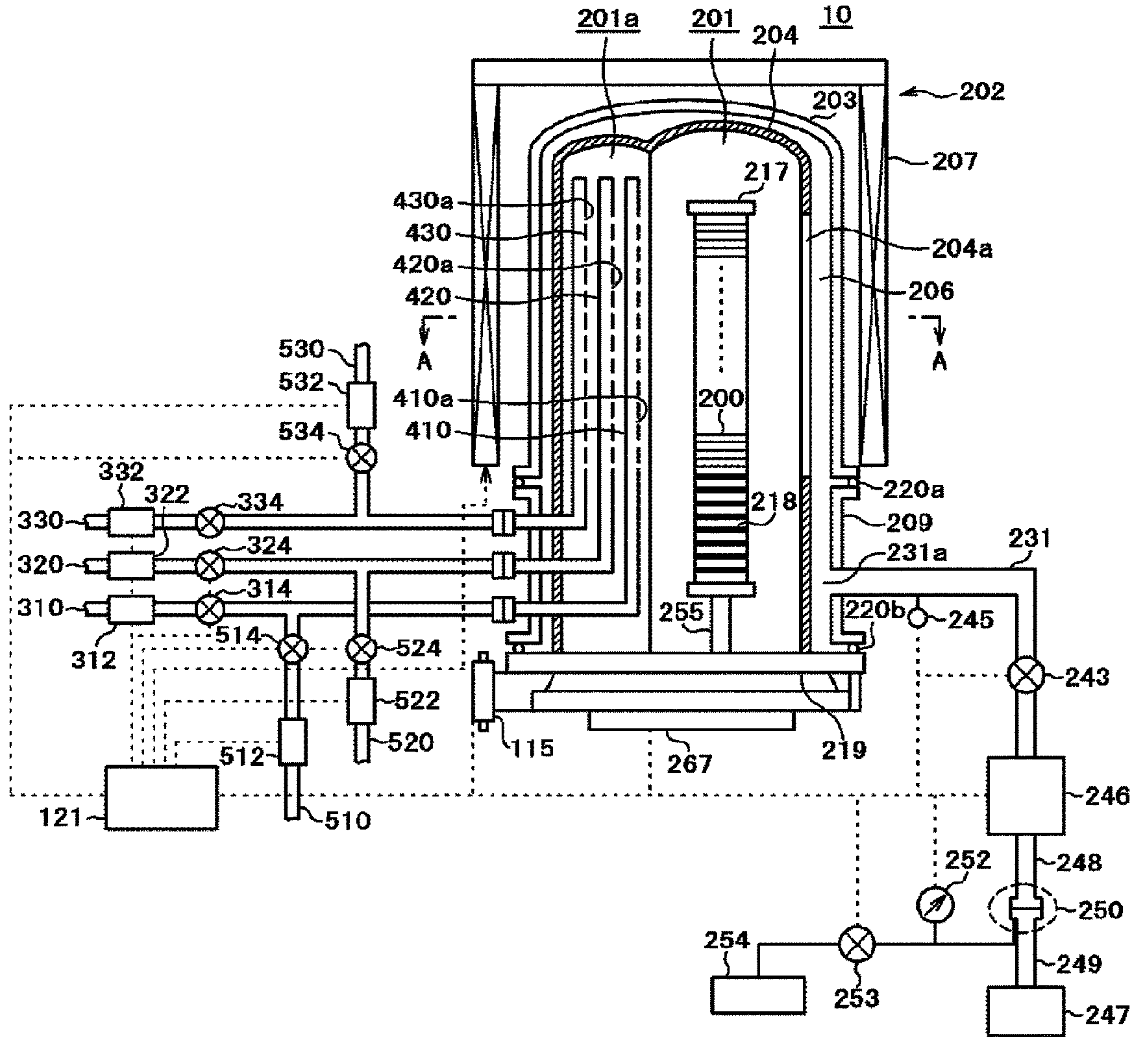
FIG. 1 is a diagram schematically illustrating a vertical cross-section of a vertical type process furnace of a substrate processing apparatus according to one or more embodiments of the present disclosure.

Hereinafter, one or more embodiments (also simply referred to as "embodiments") of the technique of the present disclosure will be described in detail mainly with reference to FIGS. 1 through 8. The drawings used in the following descriptions are all schematic. For example, a relationship between dimensions of each component and a ratio of each component shown in the drawing may not always match the actual ones. Further, even between the drawings, the relationship between the dimensions of each component and the ratio of each component may not always match.

(1) CONFIGURATION OF SUBSTRATE PROCESSING APPARATUS

A substrate processing apparatus 10 according to the present embodiments includes a process furnace 202 provided with a heater 207 serving as a heating structure (which is a heating device or a heating system). The heater 207 is of a cylindrical shape, and is vertically installed while being supported by a heater base (not shown) serving as a support plate.

An outer tube 203 constituting a reaction tube (which is a reaction vessel or a process vessel) is provided in an inner side of the heater 207 to be aligned in a manner concentric with the heater 207. For example, the outer tube 203 is made of a heat resistant material such as quartz ($SiO_2$) and silicon carbide (SiC). The outer tube 203 is of a cylindrical shape with a closed upper end and an open lower end. A manifold (which is an inlet flange) 209 is provided under the outer tube 203 to be aligned in a manner concentric with the outer tube 203. For example, the manifold 209 is made of a metal such as stainless steel (SUS). The manifold 209 is of a cylindrical shape with open upper and lower ends. An O-ring 220*a* serving as a seal is provided between the upper end of the manifold 209 and the outer tube 203. As the manifold 209 is supported by the heater base (not shown), the outer tube 203 is installed vertically.

An inner tube 204 constituting the reaction vessel is provided in an inner side of the outer tube 203. For example, the inner tube 204 is made of a heat resistant material such as quartz ($SiO_2$) and silicon carbide (SiC). The inner tube 204 is of a cylindrical shape with a closed upper end and an open lower end. The process vessel (reaction vessel) is constituted mainly by the outer tube 203, the inner tube 204 and the manifold 209. A process chamber 201 is provided in a hollow cylindrical portion of the process vessel (that is, an inside of the inner tube 204).

The process chamber 201 is configured to be capable of accommodating a plurality of wafers including a wafer 200 serving as a substrate in a horizontal orientation to be vertically arranged in a multistage manner by a boat 217 serving as a substrate support. Hereinafter, the plurality of wafers including the wafer 200 may also be simply referred to as "wafers 200".

Nozzles 410, 420 and 430 are installed in the process chamber 201 so as to penetrate a side wall of the manifold 209 and the inner tube 204. Gas supply pipes 310, 320 and 330 are connected to the nozzles 410, 420 and 430, respectively. However, the process furnace 202 of the present embodiments is not limited to the example described above.

Mass flow controllers (MFCs) 312, 322 and 332 serving as flow rate controllers (flow rate control structures) and valves 314, 324 and 334 serving as opening/closing valves are sequentially installed at the gas supply pipes 310, 320 and 330 in this order from upstream sides to downstream sides of the gas supply pipes 310, 320 and 330, respectively. Gas supply pipes 510, 520 and 530 through which an inert gas is supplied are connected to the gas supply pipes 310, 320 and 330 at downstream sides of the valves 314, 324 and 334, respectively. MFCs 512, 522 and 532 serving as flow rate controllers (flow rate control structures) and valves 514, 524 and 534 serving as opening/closing valves are sequentially installed at the gas supply pipes 510, 520 and 530 in this order from upstream sides to downstream sides of the gas supply pipes 510, 520 and 530, respectively.

The nozzles 410, 420 and 430 are connected to front ends (tips) of the gas supply pipes 310, 320 and 330, respectively. Each of the nozzles 410, 420 and 430 may be configured as an L-shaped nozzle. Horizontal portions of the nozzles 410, 420 and 430 are installed so as to penetrate the side wall of the manifold 209 and the inner tube 204. Vertical portions of the nozzles 410, 420 and 430 are installed in a preliminary chamber 201*a* of a channel shape (a groove shape) protruding outward in a radial direction of the inner tube 204 and extending in the vertical direction. That is, the vertical portions of the nozzles 410, 420 and 430 are installed in the preliminary chamber 201*a* to extend toward the upper end of the inner tube 204 (in a direction in which the wafers 200 are arranged) and along an inner wall of the inner tube 204.

The nozzles 410, 420 and 430 extend from a lower region of the process chamber 201 to an upper region of the process chamber 201. The nozzles 410, 420 and 430 are provided with a plurality of gas supply holes 410*a*, a plurality of gas supply holes 420*a* and a plurality of gas supply holes 430*a* facing the wafers 200, respectively. Thereby, a gas such as a process gas can be supplied to the wafers 200 through the gas supply holes 410*a* of the nozzle 410, the gas supply holes 420*a* of the nozzle 420 and the gas supply holes 430*a* of the nozzle 430. The gas supply holes 410*a*, the gas supply holes 420*a* and the gas supply holes 430*a* are provided from a lower portion to an upper portion of the inner tube 204. An opening area of each of the gas supply holes 410*a*, the gas supply holes 420*a* and the gas supply holes 430*a* is the same, and each of the gas supply holes 410*a*, the gas supply holes 420*a* and the gas supply holes 430*a* is provided at the same pitch. However, the gas supply holes 410*a*, the gas supply holes 420*a* and the gas supply holes 430*a* are not limited thereto. For example, the opening area of each of the gas supply holes 410*a*, the gas supply holes 420*a* and the gas supply holes 430*a* may gradually increase from the lower portion to the upper portion of the inner tube 204 to further uniformize a flow rate of the gas supplied through the gas supply holes 410*a*, the gas supply holes 420*a* and the gas supply holes 430*a*.

The gas supply holes 410*a* of the nozzle 410, the gas supply holes 420*a* of the nozzle 420 and the gas supply holes 430*a* of the nozzle 430 are provided from a lower portion to an upper portion of the boat 217 described later. Therefore, the process gas supplied into the process chamber 201 through the gas supply holes 410*a*, the gas supply holes 420*a* and the gas supply holes 430*a* is supplied onto the wafers 200 accommodated in the boat 217 from the lower portion to the upper portion thereof, that is, the entirety of the wafers 200 accommodated in the boat 217. It is preferable that the nozzles 410, 420 and 430 extend from the lower region to the upper region of the process chamber 201. However, the nozzles 410, 420 and 430 may preferably extend only to the vicinity of a ceiling of the boat 217.

A source gas serving as one of process gases is supplied into the process chamber 201 through the gas supply pipe 310 provided with the MFC 312 and the valve 314 and the nozzle 410. A reducing gas serving as one of the process gases is supplied into the process chamber 201 through the gas supply pipe 320 provided with the MFC 322 and the valve 324 and the nozzle 420.

A gas containing a Group 15 element serving as one of the process gases and different from the reducing gas is supplied into the process chamber 201 through the gas supply pipe 330 provided with the MFC 332 and the valve 334 and the nozzle 430. Hereinafter, the source gas, the reducing gas and the gas containing the Group 15 element may be collectively or individually referred to as a "process gas".

The inert gas is supplied into the process chamber 201 through the gas supply pipes 510, 520 and 530 provided with the MFCs 512, 522 and 532 and the valves 514, 524 and 534, respectively, and the nozzles 410, 420 and 430. As the inert gas, for example, nitrogen ($N_2$) gas or a rare gas such as argon (Ar) gas, helium (He) gas, neon (Ne) gas and xenon (Xe) gas may be used.

When the source gas is supplied through the gas supply pipe 310, a source gas supplier (which is a source gas supply structure or a source gas supply system) is constituted mainly by the gas supply pipe 310, the MFC 312 and the valve 314. The source gas supplier may further include the nozzle 410. The source gas supplier may also be referred to as a "metal-containing gas supplier" which is a metal-containing gas supply structure or a metal-containing gas supply system. Further, when the reducing gas is supplied through the gas supply pipe 320, a reducing gas supplier (which is a reducing gas supply structure or a reducing gas supply system) is constituted mainly by the gas supply pipe 320, the MFC 322 and the valve 324. The reducing gas supplier may further include the nozzle 420. Further, when the gas containing the Group 15 element is supplied through the gas supply pipe 330, a Group 15 element-containing gas supplier (which is a Group 15 element-containing gas supply structure or a Group 15 element-containing gas supply system) is constituted mainly by the gas supply pipe 330, the MFC 332 and the valve 334. The Group 15 element-containing gas supplier may further include the nozzle 430. A process gas supplier (which is a process gas supply structure or a process gas supply system) is constituted by the metal-containing gas supplier, the reducing gas supplier and the Group 15 element-containing gas supplier. Further, the process gas supplier may further include the nozzles 410, 420 and 430. In addition, an inert gas supplier (which is an inert gas supply structure or an inert gas supply system) is constituted mainly by the gas supply pipes 510, 520 and 530, the MFCs 512, 522 and 532 and the valves 514, 524 and 534.

According to the present embodiments, the gas is supplied into a vertically long annular space which is defined by the inner wall of the inner tube 204 and edges (peripheries) of the wafers 200 through the nozzles 410, 420 and 430 provided in the preliminary chamber 201*a*. The gas is ejected into the inner tube 204 through the gas supply holes 410*a* of the nozzle 410, the gas supply holes 420*a* of the nozzle 420 and the gas supply holes 430*a* of the nozzle 430 facing the wafers 200. More specifically, gases such as the source gas are ejected into the inner tube 204 in a direction parallel to surfaces of the wafers 200 through the gas supply holes 410*a* of the nozzle 410, the gas supply holes 420*a* of the nozzle 420 and the gas supply holes 430*a* of the nozzle 430, respectively.

An exhaust hole (which is an exhaust port) 204*a* is a through-hole facing the nozzles 410, 420 and 430, and is provided at a side wall of the inner tube 204. For example, the exhaust hole 204*a* may be of a narrow slit-shaped through-hole elongating vertically. The gas supplied into the process chamber 201 through the gas supply holes 410*a* of the nozzle 410, the gas supply holes 420*a* of the nozzle 420 and the gas supply holes 430*a* of the nozzle 430 flows over the surfaces of the wafers 200. The gas that has flowed over the surfaces of the wafers 200 is exhausted through the exhaust hole 204*a* into a gap (that is, an exhaust path 206) provided between the inner tube 204 and the outer tube 203. The gas flowing in the exhaust path 206 flows into an exhaust pipe 231 and is then discharged (exhausted) out of the process furnace 202.

The exhaust hole 204*a* is provided to face the wafers 200. The gas supplied in the vicinity of the wafers 200 in the process chamber 201 through the gas supply holes 410*a*, the gas supply holes 420*a* and the gas supply holes 430*a* flows in the horizontal direction. The gas that has flowed in the horizontal direction is exhausted through the exhaust hole 204*a* into the exhaust path 206. The exhaust hole 204*a* is not limited to the slit-shaped through-hole. For example, the exhaust hole 204*a* may be configured as a plurality of holes.

The exhaust pipe 231 through which an inner atmosphere of the process chamber 201 is exhausted is installed at the manifold 209. A pressure sensor 245 serving as a pressure detector (pressure detecting structure) configured to detect an inner pressure of the process chamber 201, an APC (Automatic Pressure Controller) valve 243 and a vacuum pump 246 serving as a vacuum exhaust apparatus (first exhaust apparatus) are sequentially installed at the exhaust pipe 231 in this order from an upstream side to a downstream side of the exhaust pipe 231. With the vacuum pump 246 in operation, the APC valve 243 may be opened or closed to perform a vacuum exhaust of the process chamber 201 or stop the vacuum exhaust. Further, with the vacuum pump 246 in operation, an opening degree of the APC valve 243 may be adjusted in order to adjust the inner pressure of the process chamber 201. An exhauster (which is an exhaust structure or an exhaust system) is constituted mainly by the exhaust hole 204*a*, the exhaust path 206, the exhaust pipe 231, the APC valve 243 and the pressure sensor 245. The exhauster may further include the vacuum pump 246.

A seal cap 219 serving as a furnace opening lid capable of airtightly sealing a lower end opening of the manifold 209 is provided under the manifold 209. The seal cap 219 is in contact with the lower end of the manifold 209 from thereunder. For example, the seal cap 219 is made of a metal such as SUS, and is of a disk shape. An O-ring 220*b* serving as a seal is provided on an upper surface of the seal cap 219 so as to be in contact with the lower end of the manifold 209. A rotator 267 configured to rotate the boat 217 accommodating the wafers 200 is provided at the seal cap 219 in a manner opposite to the process chamber 201. A rotating shaft 255 of the rotator 267 is connected to the boat 217 through the seal cap 219. As the rotator 267 rotates the boat 217, the wafers 200 are rotated. The seal cap 219 may be elevated or lowered in the vertical direction by a boat elevator 115 serving as an elevating structure vertically provided outside the outer tube 203. When the seal cap 219 is elevated or lowered in the vertical direction by the boat elevator 115, the boat 217 may be transferred (loaded) into the process chamber 201 or transferred (unloaded) out of the process chamber 201. The boat elevator 115 serves as a transfer device (which is a transfer structure or a transfer system) that loads the boat 217 and the wafers 200 accommodated in the boat 217 into the process chamber 201 or unloads the boat 217 and the wafers 200 accommodated in the boat 217 out of the process chamber 201.

The boat 217 is configured to accommodate (or support) the wafers 200 (for example, 25 to 200 wafers) while the wafers 200 are horizontally oriented with their centers aligned with one another with a predetermined interval therebetween in a vertical direction. For example, the boat 217 is made of a heat resistant material such as quartz and SiC. A plurality of dummy substrates 218 horizontally oriented are placed under the boat 217 in a multistage manner. Each of the dummy substrates 218 is made of a heat resistant material such as quartz and SiC. With such a configuration, the dummy substrates 218 suppress the transmission of the heat from the heater 207 to the seal cap 219. However, the present embodiments are not limited thereto. For example, instead of the dummy substrates 218, a heat insulating cylinder (not shown) such as a cylinder made of a heat resistant material such as quartz and SiC may be provided under the boat 217.

Figure 2:
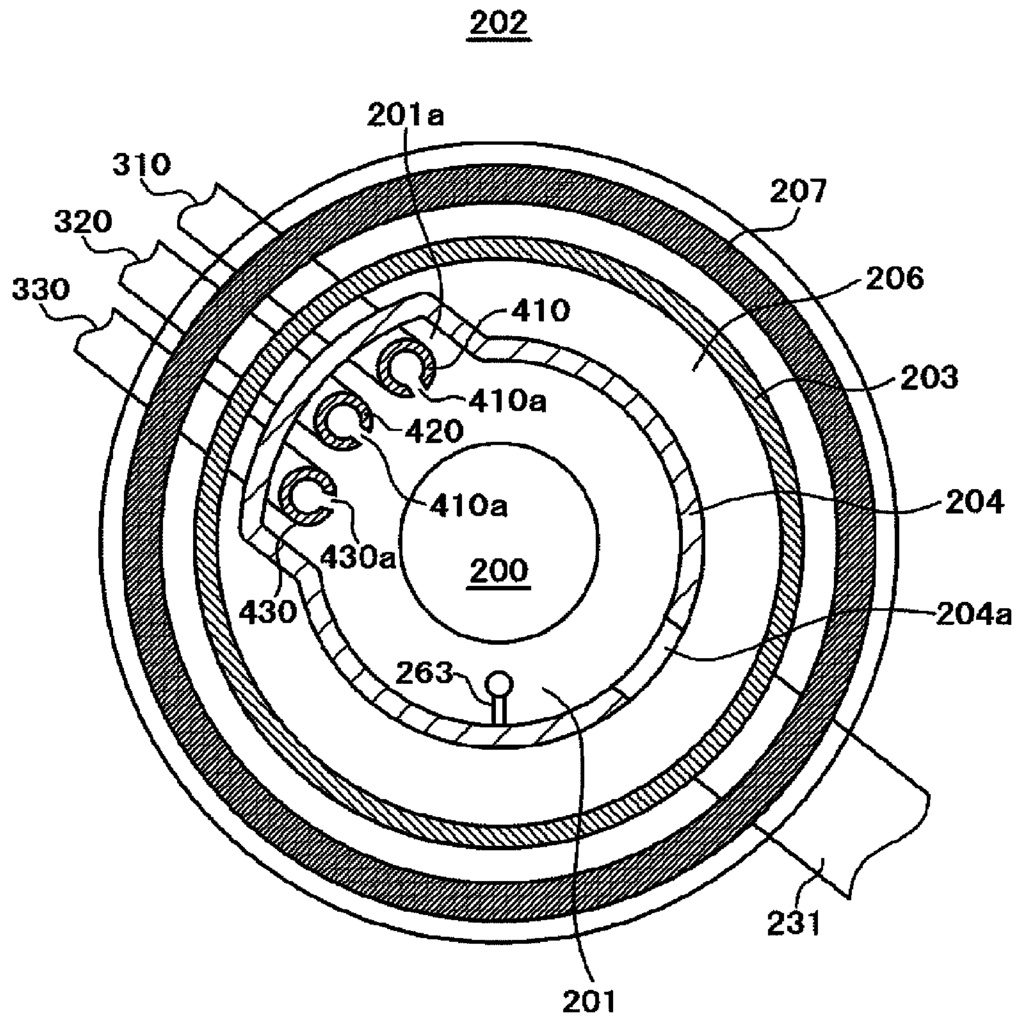
FIG. 2 is a diagram schematically illustrating a horizontal cross-section taken along a line A-A of the substrate processing apparatus shown in FIG. 1.

As shown in FIG. 2, a temperature sensor 263 serving as a temperature detector is installed in the inner tube 204. An amount of the current supplied (or applied) to the heater 207 is adjusted based on temperature information detected by the temperature sensor 263 such that a desired temperature distribution of an inner temperature of the process chamber 201 can be obtained. Similar to the nozzles 410, 420 and 430, the temperature sensor 263 is L-shaped, and is provided along the inner wall of the inner tube 204.

<Leakage Detection Apparatus>

Figure 3:
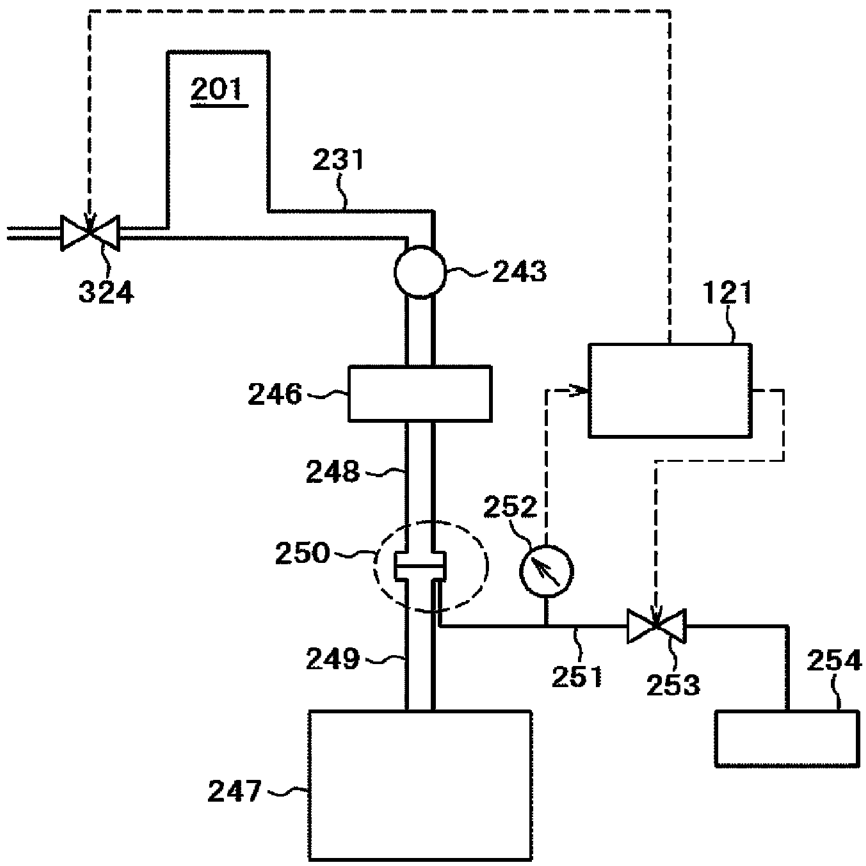
FIG. 3 is a diagram schematically illustrating a configuration of an exhauster of the substrate processing apparatus according to the embodiments of the present disclosure.

As shown in FIGS. 1 and 3, a detoxification apparatus 247 is located downstream of the vacuum pump 246 to treat (or process) a harmful or flammable gas (for example, a special high-pressure gas or hydrogen gas). It is possible to improve a safety by providing the detoxification apparatus 247. A first pipe (first piping) 248 is provided at the vacuum pump 246 so as to connect the vacuum pump 246 to the detoxification apparatus 247. A second pipe (second piping) 249 is provided at the detoxification apparatus 247 so as to connect the detoxification apparatus 247 to the vacuum pump 246. The exhauster described above may further include the vacuum pump 246, the detoxification apparatus 247, the first pipe 248 and the second pipe 249. An inner pressure of the first pipe 248 and an inner pressure of the second pipe 249 may be close to an atmospheric pressure. For example, depending on the flow rate of the gas, the inner pressure of the first pipe 248 or the inner pressure of the second pipe 249 may be greater than the atmospheric pressure. In a case where a piping connector (which is a piping connecting structure) configured to connect the first pipe 248 and the second pipe 249 is designed to be used exclusively in a reduced pressure state, when the inner pressure of the first pipe 248 or the inner pressure of the second pipe 249 is greater than the atmospheric pressure, the gas may leak. That is, a gas leakage may occur.

Figure 4:
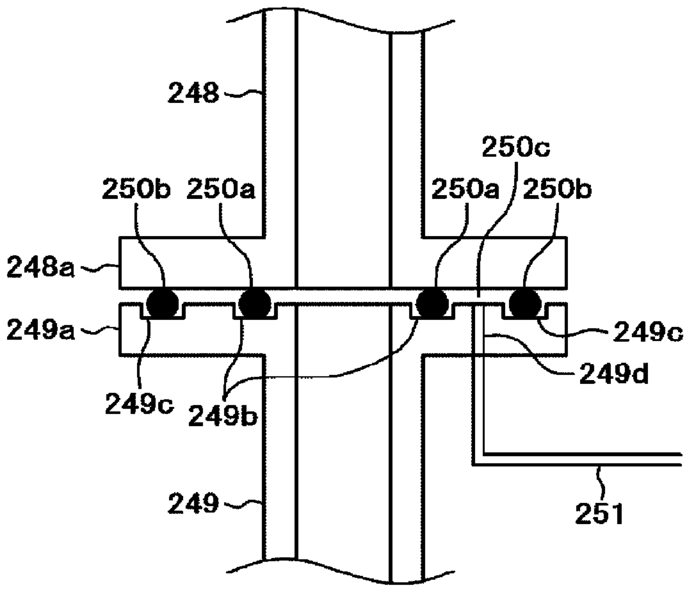
FIG. 4 is a diagram schematically illustrating a cross-section of a piping connector of the exhauster of the substrate processing apparatus according to the embodiments of the present disclosure.

As shown in FIG. 4, the first pipe 248 is provided with a flange 248*a*, and the second pipe 249 is provided with a flange 249*a*. By making the flange 248*a* face the flange 249*a* each other and sealing the flange 248*a* and the flange 249*a* with two O-rings 250*a* and 250*b*, the first pipe 248 and the second pipe 249 are connected. A piping connector 250 is constituted by the flanges 248*a* and 249*a* and the O-rings 250*a* and 250*b*. The two O-rings 250*a* and 250*b* are arranged between the flanges 248*a* and 249*a* facing each other so as to seal a boundary between insides and outsides of the flanges 248*a* and 249*a* in a double seal manner. The flange 249*a* serving as one of the two opposing flanges is provided with grooves 249*b* and 249*c* respectively provided on the inside and the outside of the flange 249*a* in a concentric manner. Thus, a diameter of the groove 249*b* is different from a diameter of the groove 249*c*. The two O-rings 250*a* and 250*b* are fitted and installed in the grooves 249*b* and 249*c*, respectively. Thereby, it is possible to fix positions of the two O-rings 250*a* and 250*b*. While the present embodiments are described by way of an example in which grooves (for example, the grooves 249*b* and 249*c*) into which the two O-rings 250*a* and 250*b* are fitted are provided in the flange 249*a*, the present embodiments are not limited thereto. For example, the grooves into which the two O-rings 250*a* and 250*b* are fitted may be provided in the flange 248*a* or may be provided in both the flanges 248*a* and 249*a*. The flange 249*a* is provided with a communication hole 249*d* communicating with a space 250*c* surrounded by the two O-rings 250*a* and 250*b*. A communication hole pipe (communication hole piping) 251 serving as a monitor pipe is connected to the communication hole 249*d* so as allow a fluid communication. The communication hole 249*d* may be provided at the flange 248*a*.

As shown in FIG. 3, a pressure sensor (pressure gauge) 252 capable of measuring an inner pressure of the communication hole pipe 251, a valve 253 and an exhaust apparatus 254 are sequentially are connected to the communication hole pipe 251 in this order from an upstream side to a downstream side of the communication hole pipe 251. The valve 253 is configured to be capable of being opened and closed to fluidly connect the communication hole pipe 251 to the exhaust apparatus 254. With such a configuration, a controller 121 described later is capable of controlling an opening and closing operation of the valve 253 so as to maintain a pressure measured by the pressure sensor 252 within a predetermined pressure range lower than the inner pressure of the first pipe 248 and the inner pressure of the second pipe 249. Since the space 250*c* is in a reduced pressure environment (reduced pressure state) by the exhaust apparatus 254 serving as a second exhaust apparatus, even when the gas leaks from the O-rings 250*a* and 250*b*, the gas leaks into the space 250*c* and is guided to the exhaust apparatus 254. Further, even when the gas leaks from the O-ring 250*b* provided outer than the O-ring 250*a*, the gas will not leak from the space 250*c* in the reduced pressure state to a surrounding atmosphere in a high pressure state. Thereby, it is possible to prevent the gas leakage from the piping connector 250 to the outside. Further, when the gas leaks, the controller 121 is capable of stopping a supply of the gas to the process chamber 201 by closing the valve 324. A leakage detection apparatus is constituted by the piping connector 250, the communication hole pipe 251, the pressure sensor 252, the valve 253, the exhaust apparatus 254 and the controller 121. For example, the communication hole pipe 251 may be connected to an intake side of the vacuum pump 246 via the valve 253 and the exhaust pipe 231. In such a case, it is possible to omit the exhaust apparatus 254. When the exhaust apparatus 254 is provided, it is possible to omit a processing of the exhaust pipe 231 for connecting to the communication hole pipe 251.

Figure 5:
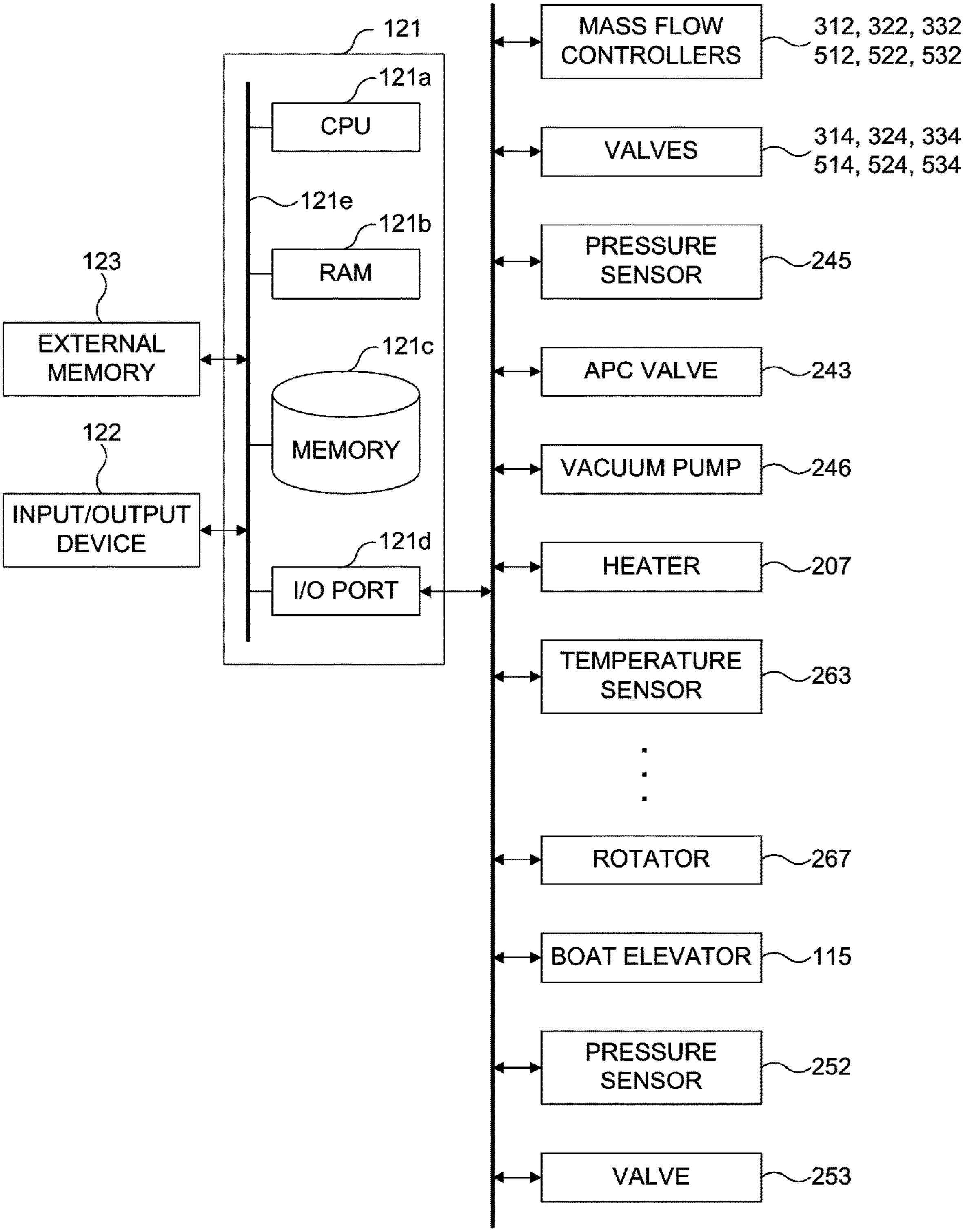
FIG. 5 is a block diagram schematically illustrating a configuration of a controller and related components of the substrate processing apparatus according to the embodiments of the present disclosure.

As shown in FIG. 5, the controller 121 serving as a control device (or a control structure) is constituted by a computer including a CPU (Central Processing Unit) 121*a*, a RAM (Random Access Memory) 121*b*, a memory 121*c* and an I/O port 121*d*. The RAM 121*b*, the memory 121*c* and the I/O port 121*d* may exchange data with the CPU 121*a* through an internal bus (not shown). For example, an input/output device 122 constituted by a component such as a touch panel is connected to the controller 121.

The memory 121*c* is configured by a component such as a flash memory and a hard disk drive (HDD). For example, a control program configured to control an operation of the substrate processing apparatus 10 or a process recipe containing information on sequences and conditions of a method of manufacturing a semiconductor device (that is, a substrate processing method) described later is readably stored in the memory 121*c*. The process recipe is obtained by combining steps of the method of manufacturing the semiconductor device (substrate processing method) described later such that the controller 121 can execute the steps to acquire a predetermined result, and functions as a program. Hereafter, the process recipe and the control program may be collectively or individually referred to as a "program". Thus, in the present specification, the term "program" may refer to the process recipe alone, may refer to the control program alone, or may refer to a combination of the process recipe and the control program. The RAM 121*b* functions as a memory area (work area) where a program or data read by the CPU 121*a* is temporarily stored.

The I/O port 121*d* is connected to the components described above such as the MFCs 312, 322, 332, 512, 522 and 532, the valves 314, 324, 334, 514, 524, 534 and 253, the pressure sensors 245 and 252, the APC valve 243, the vacuum pump 246, the heater 207, the temperature sensor 263, the rotator 267 and the boat elevator 115.

The CPU 121*a* is configured to read the control program from the memory 121*c* and execute the read control program. In addition, the CPU 121*a* is configured to read a recipe such as the process recipe from the memory 121*c* in accordance with an operation command inputted from the input/output device 122. In accordance with the contents of the read recipe, the CPU 121*a* may be configured to control various operations such as flow rate adjusting operations for various gases by the MFCs 312, 322, 332, 512, 522 and 532, opening and closing operations of the valves 314, 324, 334, 514, 524 and 534, an opening and closing operation of the APC valve 243, a pressure adjusting operation by the APC valve 243 based on the pressure sensor 245, an opening and closing operation of the valve 253 based on the pressure sensor 252, a temperature adjusting operation by the heater 207 based on the temperature sensor 263, a start and stop of the vacuum pump 246, an operation of adjusting a rotation and a rotation speed of the boat 217 by the rotator 267, an elevating and lowering operation of the boat 217 by the boat elevator 115 and an operation of transferring and accommodating the wafer 200 into the boat 217.

The controller 121 may be embodied by installing the above-described program stored in an external memory 123 into a computer. For example, the external memory 123 may include a magnetic tape, a magnetic disk such as a flexible disk and a hard disk, an optical disk such as a CD and a DVD, a magneto-optical disk such as an MO and a semiconductor memory such as a USB memory and a memory card. The memory 121*c* or the external memory 123 may be embodied by a non-transitory computer readable recording medium. Hereafter, the memory 121*c* and the external memory 123 are collectively or individually referred to as a "recording medium". Thus, in the present specification, the term "recording medium" may refer to the memory 121*c* alone, may refer to the external memory 123 alone, and may refer to both of the memory 121*c* and the external memory 123. Instead of the external memory 123, a communication structure such as the Internet and a dedicated line may be used for providing the program to the computer.

(2) SUBSTRATE PROCESSING

Figure 6:
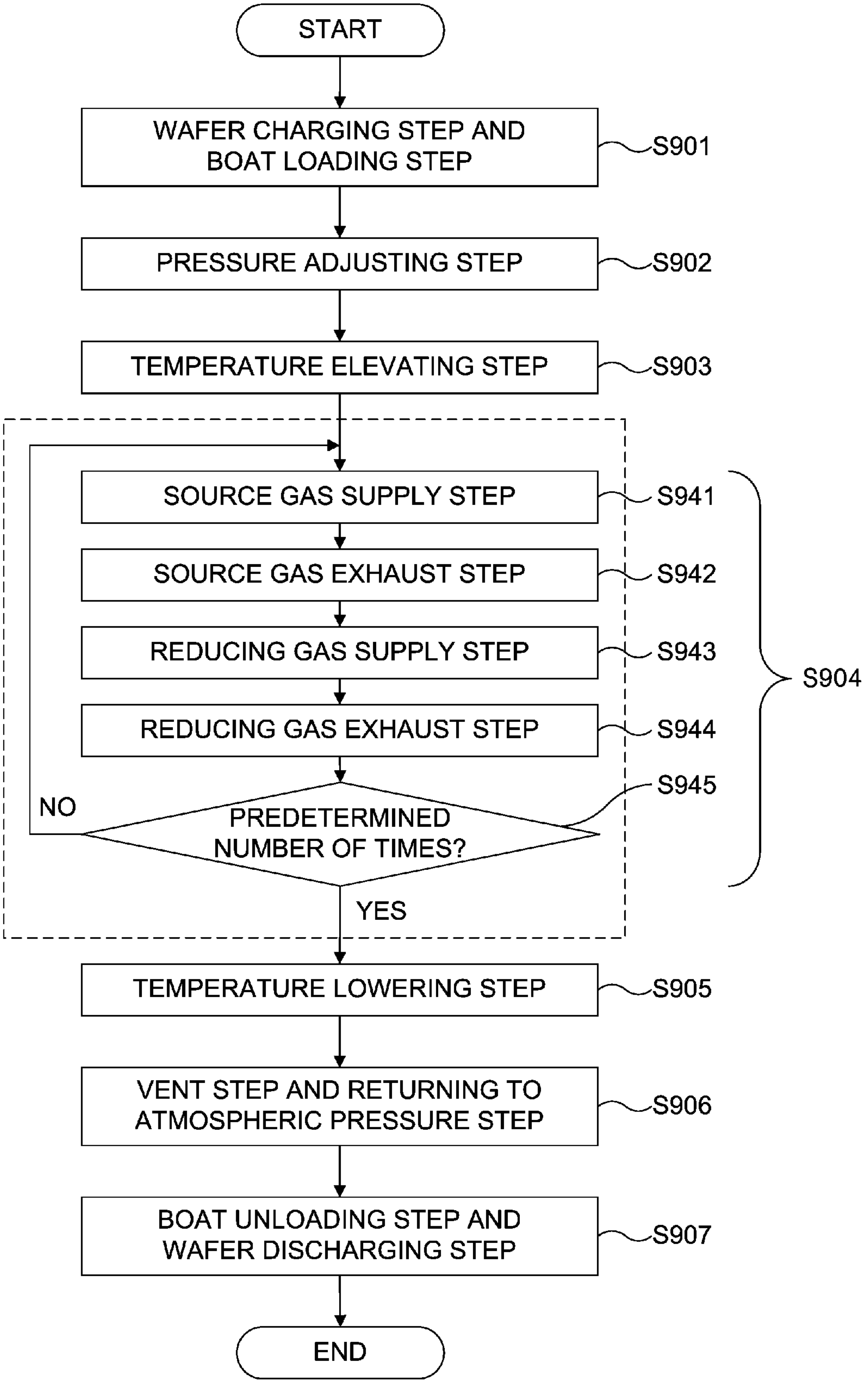
FIG. 6 is a flow chart schematically illustrating a method of manufacturing a semiconductor device according to the embodiments of the present disclosure.

Hereinafter, an example of forming a predetermined film on the wafer 200 using the source gas and the reducing gas will be described with reference to FIG. 6. In the following description, operations of components constituting the substrate processing apparatus 10 are controlled by the controller 121.

In a film forming process (substrate processing) according to the present embodiments, a film is formed on the wafer 200 by performing a cycle a predetermined number of times (at least once). The cycle may include: a step (S941) of supplying the source gas to the wafer 200 in the process chamber 201; a step (S942) of removing the source gas (residual gas) from the process chamber 201; a step (S943) of supplying the reducing gas to the wafer 200 in the process chamber 201; and a step (S944) of removing the reducing gas (residual gas) from the process chamber 201. In the cycle, the steps S941 to the S944 are performed non-simultaneously.

In the present specification, the term "wafer" may refer to "a wafer itself (that is, a bare wafer)", or may refer to "a wafer and a stacked structure (aggregated structure) of a predetermined layer (or layers) or a film (or films) formed on a surface of the wafer". Similarly, the term "a surface of a wafer" may refer to "a surface of a wafer itself", or may refer to "a surface of a predetermined layer or a film formed on a wafer, i.e. a top surface (uppermost surface) of the wafer as a stacked structure". In the present specification, the term "substrate" may also be interpreted similarly to the term "wafer".

<S901: Wafer Charging Step and Boat Loading Step>

First, the wafers 200 are charged (transferred) into the boat 217 (wafer charging step). Then, the lower end opening of the manifold 209 is opened (shutter opening step). Thereafter, as shown in FIG. 1, the boat 217 supporting the wafers 200 is elevated by the boat elevator 115 and loaded (transferred) into the process chamber 201 (boat loading step). With the boat 217 loaded, the seal cap 219 airtightly seals the lower end of the manifold 209 via the O-ring 220*b*.

<S902: Pressure Adjusting Step>

Thereafter, the vacuum pump 246 vacuum-exhausts (decompresses and exhausts) the inner atmosphere of the process chamber 201 (that is, a space in which the wafers 200 are accommodated) such that the inner pressure of the process chamber 201 reaches and is maintained at a desired pressure (vacuum degree). In the present step, the inner pressure of the process chamber 201 is measured by the pressure sensor 245, and the APC valve 243 is feedback-controlled based on pressure information detected by the pressure sensor 245. The vacuum pump 246 continuously vacuum-exhausts the inner atmosphere of the process chamber 201 until at least a processing of the wafer 200 is completed.

<S903: Temperature Elevating Step>

Further, the heater 207 heats the process chamber 201 such that a temperature of the wafer 200 in the process chamber 201 reaches and is maintained at a desired process temperature. In the present step, the state of the electric conduction to the heater 207 is feedback-controlled based on the temperature information detected by the temperature sensor 263 such that a desired temperature distribution of the inner temperature of the process chamber 201 can be obtained. In addition, a rotation of the wafer 200 is started by the rotator 267. The heater 207 continuously heats the wafer 200 in the process chamber 201 and the rotator 267 continuously rotates the wafer 200 until at least the processing of the wafer 200 is completed.

<S904: Film Forming Step>

When the inner temperature of the process chamber 201 is stabilized at the process temperature (which is set in advance), the following four steps (sub-steps), that is, the step S941, the step S942, the step S943 and the step S944 are sequentially performed. In addition, during the film forming step S904, the rotator 267 rotates the boat 217 via the rotating shaft 255 such that the wafers 200 are rotated.

<S941: Source Gas Supply Step>

In the present step, by supplying the source gas to the wafer 200 in the process chamber 201, a first layer is formed on an uppermost surface of the wafer 200. Specifically, the valve 314 is opened to supply the source gas into the gas supply pipe 310. A flow rate of the source gas supplied into the gas supply pipe 310 is adjusted by the MFC 312. The source gas whose flow rate is adjusted is then supplied into a process region of the process chamber 201 through the gas supply holes 410*a* of the nozzle 410, and is exhausted through the exhaust pipe 231 via an exhaust port 231*a*. In the present step, simultaneously with a supply of the source gas, the valve 514 is opened to supply the inert gas into the gas supply pipe 510. A flow rate of the inert gas supplied into the gas supply pipe 510 is adjusted by the MFC 512. The inert gas whose flow rate is adjusted is then supplied into the process region of the process chamber 201 together with the source gas through the gas supply holes 410*a* of the nozzle 410, and is exhausted through the exhaust pipe 231. In the present step, simultaneously with the supply of the source gas, the inert gas is also supplied into the process region of the process chamber 201 through the gas supply holes 420*a* of the nozzle 420 and the gas supply holes 430*a* of the nozzle 430, and is exhausted through the exhaust pipe 231. In the present step, the controller 121 performs a constant pressure control with a first pressure as a target pressure.

<S942: Source Gas Exhaust Step>

After the first layer is formed, the valve 314 is closed to stop the supply of the source gas into the process chamber 201, and a control is performed with the APC valve 243 fully opened. As a result, the inner atmosphere of the process chamber 201 is vacuum-exhausted to remove a residual gas such as the source gas in the process chamber 201 which did not react or which did contribute to a formation of the first layer from the process chamber 201. In the present step, the residual gas may be purged by the inert gas supplied into the process chamber 201 with the valve 514 maintained open. A flow rate of a purge gas (that is, the inert gas) supplied through the nozzle 410 is set such that a partial pressure of a low vapor pressure gas is lower than a saturated vapor pressure in an exhaust path, or such that a flow velocity of the gas in the outer tube 203 is greater than a diffusion speed of the gas.

<S943: Reducing Gas Supply Step>

After the step S942 is completed, the valve 324 is opened to supply the reducing gas into the gas supply pipe 320. Thereby, the reducing gas is supplied to the wafer 200 in the process chamber 201, that is, to the first layer formed on the wafer 200. A flow rate of the reducing gas supplied into the gas supply pipe 320 is adjusted by the MFC 322. The reducing gas whose flow rate is adjusted is then supplied into the process region of the process chamber 201 through the gas supply holes 420*a* of the nozzle 420, and is exhausted through the exhaust pipe 231 via the exhaust port 231*a*. In the present step, simultaneously with a supply of the reducing gas, the valve 524 is opened to supply the inert gas into the gas supply pipe 520. A flow rate of the inert gas supplied into the gas supply pipe 520 is adjusted by the MFC 522. The inert gas whose flow rate is adjusted is then supplied into the process region of the process chamber 201 together with the reducing gas through the gas supply holes 420*a* of the nozzle 420, and is exhausted through the exhaust pipe 231 via the exhaust port 231*a*. In the present step, simultaneously with the supply of the reducing gas, the inert gas is also supplied into the process region of the process chamber 201 through the gas supply holes 410*a* of the nozzle 410 and the gas supply holes 430*a* of the nozzle 430, and is exhausted through the exhaust pipe 231 via the exhaust port 231*a*. In the present step, the controller 121 performs the constant pressure control with a second pressure as the target pressure. For example, each of the first pressure and the second pressure may be set to a pressure within a range from 100 Pa to 5,000 Pa.

In the present embodiments, as the reducing gas, for example, a gas constituted by hydrogen (H) may be used. Preferably, a gas constituted by hydrogen alone may be used. Specifically, a gas such as hydrogen ($H_2$) gas and deuterium ($D_2$) may be used as the reducing gas. The hydrogen gas is a flammable gas.

<S944: Reducing Gas Exhaust Step>

After a predetermined time has elapsed from a start of the supply of the reducing gas, the valve 324 is closed to stop the supply of the reducing gas into the process chamber 201, and the constant pressure control with a zero (0) pressure as the target pressure is performed (that is, a full-open pressure control is performed). As a result, the inner atmosphere of the process chamber 201 is vacuum-exhausted to remove a residual gas such as the reducing gas in the process chamber 201 which did not react or which did contribute to the formation of the first layer from the process chamber 201. In the step S944, similarly to the step S942, a predetermined amount of the inert gas may be supplied into the process chamber 201 as the purge gas. The ultimate pressure in the source gas exhaust step S942 or the reducing gas exhaust step S944 may be 100 Pa or less, preferably may be set to a pressure within a range from 10 Pa to 50 Pa. The inner pressure of the process chamber 201 when the gas is supplied may be different from that of the process chamber 201 when the gas is exhausted by 10 times or more.

<S945: Performing Predetermined Number of Times>

By performing the cycle wherein the steps S941 to S944 described above are performed sequentially and non-simultaneously in this order (that is, in a non-overlapping manner) a predetermined number of times (n times), a film with a predetermined composition and a predetermined thickness can be formed on the wafer 200.

<S905: Temperature Lowering Step>

In the present step, the inner temperature of the process chamber 201 is gradually lowered, when necessary, by stopping a temperature control of the step S903 which has been continued during the film forming step or by re-setting the process temperature of the step S903 to a lower temperature.

<S906: Vent Step and Returning to Atmospheric Pressure Step>

After the film-forming step S904 is completed, the inert gas is supplied into the process chamber 201 through each of the nozzles 410, 420 and 430, and is exhausted through the exhaust pipe 231 via the exhaust port 231*a*. The inert gas supplied through each of the nozzles 410, 420 and 430 acts as the purge gas. Thereby, the inner atmosphere of the process chamber 201 is purged with the purge gas. As a result, a substance such as a residual gas and reaction by-products remaining in the process chamber 201 is removed from the process chamber 201 (after-purge step). Thereafter, the inner atmosphere of the process chamber 201 is replaced with the inert gas (substitution by inert gas), and the inner pressure of the process chamber 201 is returned to the normal pressure (atmospheric pressure) (returning to atmospheric pressure step).

<S907: Boat Unloading Step and Wafer Discharging Step>

Thereafter, the seal cap 219 is lowered by the boat elevator 115 and the lower end of the manifold 209 is opened. Then, the boat 217 with the wafers (which are processed) 200 supported therein is unloaded (transferred) out of the outer tube 203 through the lower end of the manifold 209 (boat unloading step). After the boat 217 is unloaded, the wafers (which are processed) 200 are discharged (transferred) from the boat 217 after the boat 217 is unloaded out of the reaction tube 203 (wafer discharging step).

<Gas Leakage Detection>

A detection of the gas leakage from the piping connector 250 is performed before the step S904 in the substrate processing (for example, during the steps S902 and S903) and during the step S904. The former is also referred to as a "check before a gas introduction" (step S10), and the latter is also referred to as a "constant monitoring during the gas introduction" (step S20). In the following description, the reducing gas will be used as an example of the gas to be introduced (supplied).

Figure 7:
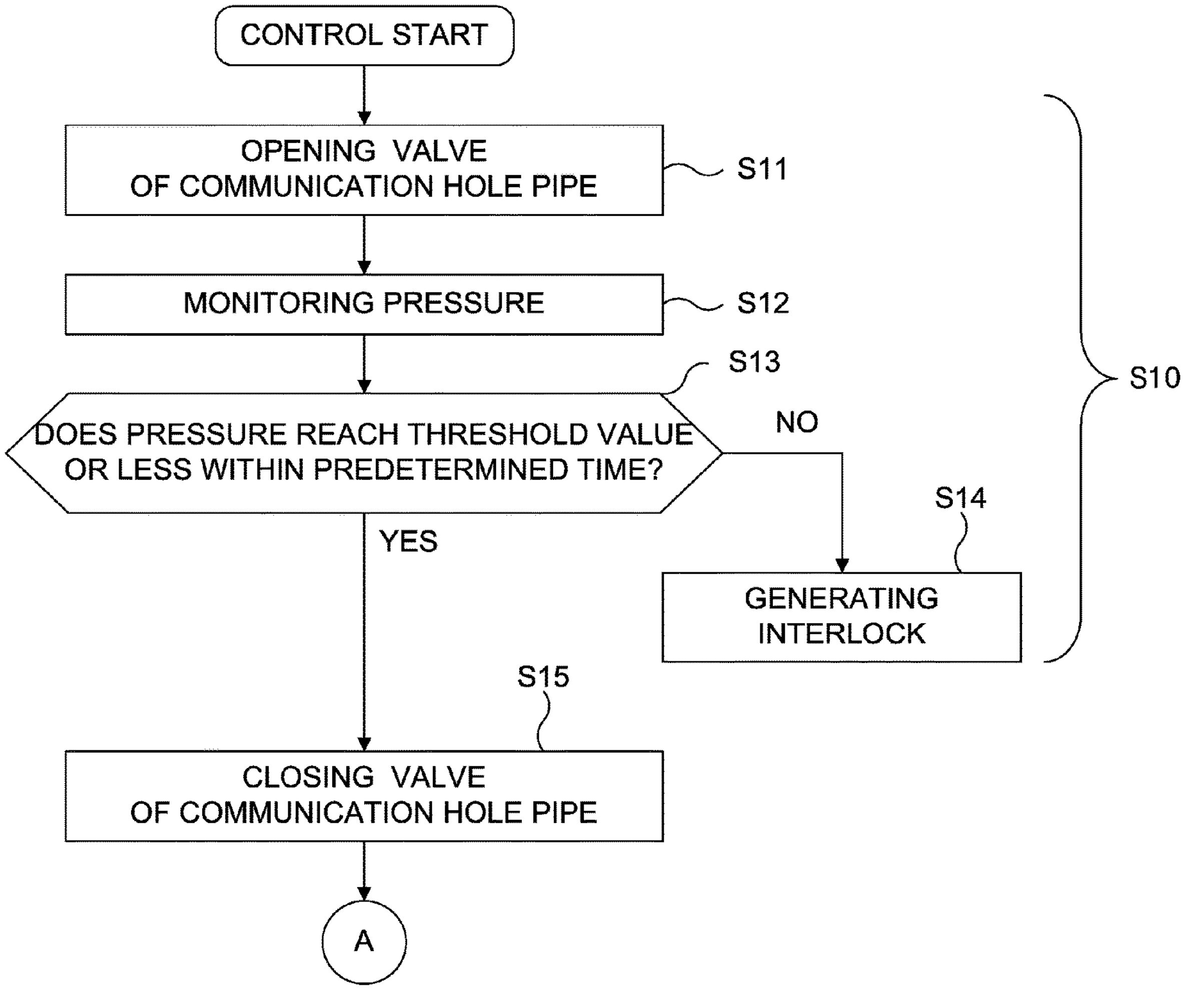
FIG. 7 is a flow chart schematically illustrating a leakage detection process before a gas introduction according to the embodiments of the present disclosure.

As shown in FIG. 7, first, as the check before the gas introduction (step S10), before flowing the gas (with the valve 324 closed), the valve 253 installed in the communication hole pipe 251 is opened (step S11). Then, a pressure (inner pressure) of the space 250*c* is monitored by the pressure sensor 252 (step S12). Since the valve 253 is open, the pressure is decreased (lowered) by the exhaust apparatus 254. However, in a case where the airtightness of the piping connector 250 is not ensured, it will take longer to decrease the pressure of the space 250*c* as compared with a case where the airtightness is ensured. When decreasing the pressure, it is checked whether the pressure of the space

Figure 8:
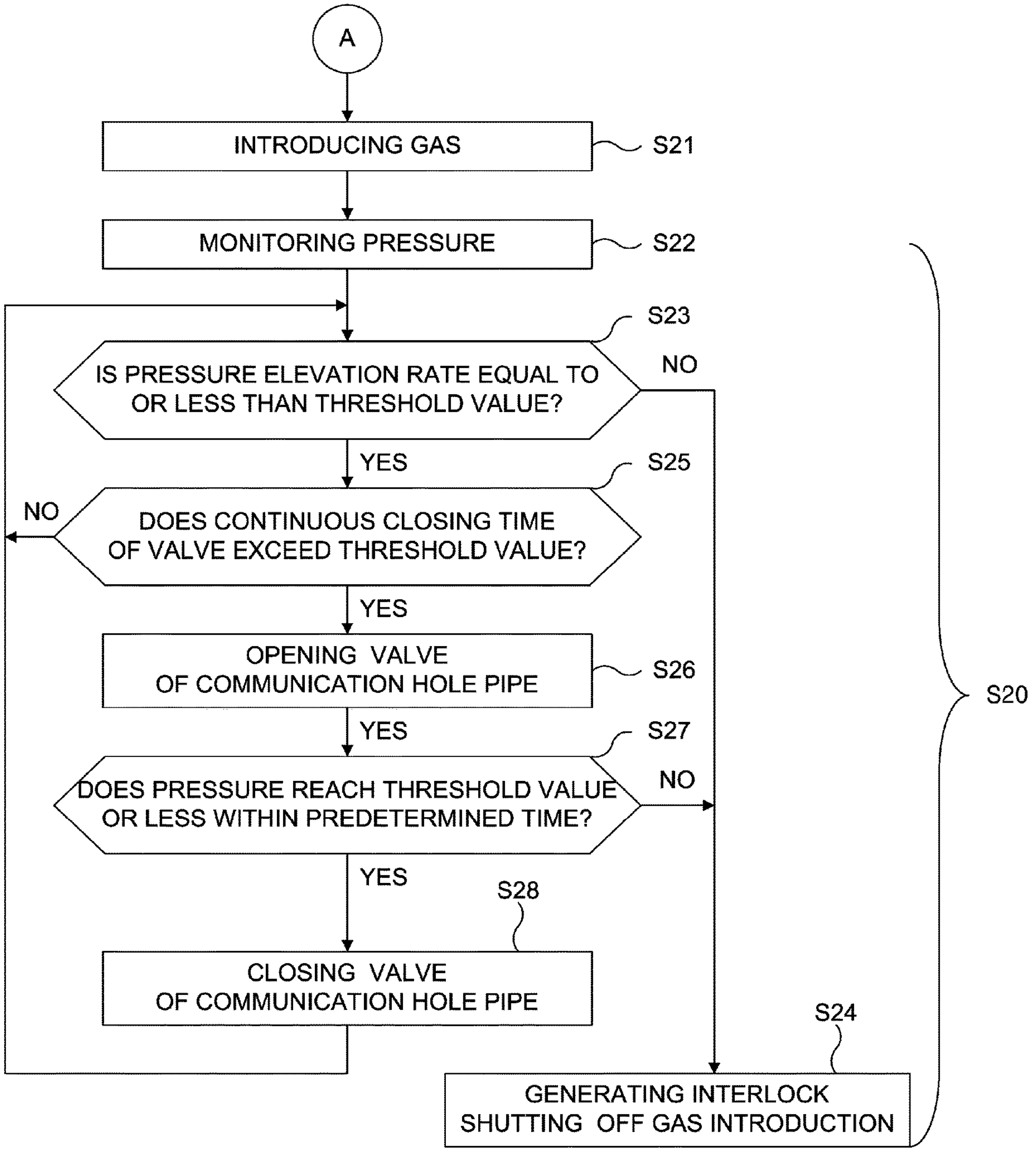
FIG. 8 is a flow chart schematically illustrating a constant monitoring process during the gas introduction according to the embodiments of the present disclosure.

250*c* reaches a first threshold value (for example, 1 kPa) or less within a predetermined time. Thereby, it is possible to determine the presence or absence of the leakage (gas leakage check) (step S13). When the pressure of the space 250*c* does not reach the first threshold value or less, in other words, when an accumulative time (opening time) during which the valve 253 is open after the step S11 is greater than the predetermined time in a state where the pressure of the space 250*c* exceeds the first threshold value ("NO" in FIG. 7), it is determined that the gas leakage occurs, and an interlock is generated (step S14). When it is determined that there is no gas leakage ("YES" in FIG. 7), the valve 253 installed in the communication hole pipe 251 is closed (step S15) to allow the gas to flow. After the step S15, a step S21 shown in FIG. 8 is performed. Since the gas leakage can be detected before the gas is introduced, it is possible to prevent the leakage of the gas such as the harmful gas.

As shown in FIG. 8, when flowing the gas, the valve 324 is opened to introduce (supply) the gas into the process chamber 201 (step S21). In the constant monitoring during the gas introduction (step S20), the pressure (inner pressure) of the space 250*c* is monitored by the pressure sensor 252 (step S22). Before the valve 253 is closed, the pressure of the space 250*c* is set to be equal to or lower than a predetermined pressure. Further, when the gas leakage occurs, the pressure of the space 250*c* is increased. A threshold value is set for a pressure elevation rate (pressure increase rate), and the presence or absence of the gas leakage is checked (step S23). When the pressure elevation rate is greater than the threshold value ("NO" in the step S23) or when the pressure of the space 250*c* is greater than an upper limit value (for example, 3 kPa), it is determined that the gas leakage occurs, and an interlock is generated and the valve 324 is closed to block (shut off) the introduction of the gas (step S24). Thereby, it is possible to block an inflow of the harmful gas (which is hazardous) into a portion where the gas leakages occurs, and it is also possible to ensure a safe state. Further, even when the pressure elevation rate is equal to or less than the threshold value and it is determined that there is no gas leakage ("YES" in the step S23), since the valve 253 is closed, the pressure of the space 250*c* will be gradually increased. Therefore, a continuous closing time of the valve 253 installed in the communication hole pipe 251 or the pressure of the space 250*c* is checked (step S25). When the continuous closing time does not exceed a threshold value ("NO" in the step S25), the steps S23 and S25 are performed again. When the continuous closing time exceeds the threshold value ("YES" in the step S25) or when the pressure of the space 250*c* exceeds a second threshold value (for example, 2 kPa) which is greater than the first threshold value, the valve 253 is opened to return the pressure of the space 250*c* to the reduced pressure state which is predetermined (step S26). Thereby, it is possible to maintain the pressure of the space 250*c* in the reduced pressure state within a pressure range between the first threshold value and the second threshold value. Similarly to the step S13, it is checked whether the pressure of the space 250*c* reaches a threshold value (for example, the second threshold value) or less within a predetermined time. Thereby, it is possible to determine the presence or absence of the leakage (gas leakage check) (step S27). When the pressure of the space 250*c* does not reach the threshold value or less ("NO" in the step S27), it is determined that the gas leakage occurs, and the interlock is generated and the valve 324 is closed to block (shut off) the introduction of the gas (step S24). When it is determined that there is no gas leakage ("YES" in the step S27), the valve 253 installed in the communication hole pipe 251 is closed (step S28). By performing such a processing described above, it is possible to perform the constant monitoring described above. Since the gas leakage can be detected during the gas introduction and the supply of the gas can be stopped by detecting the gas leakage during the gas introduction, it is possible to ensure a safer state.

Comparative Example

Figure 9:
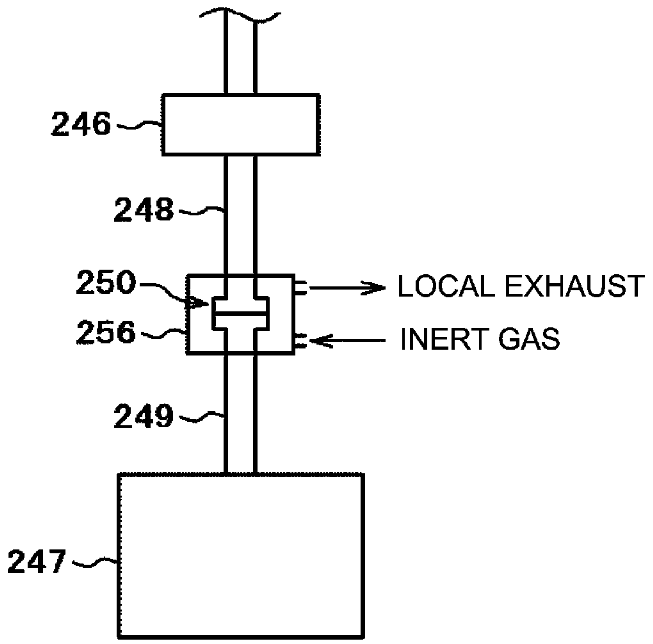
FIG. 9 is a diagram schematically illustrating a comparative example of the exhauster according to the embodiments of the present disclosure.

As a configuration for preventing the gas leakage to the outside, as shown in FIG. 9, an inert purge structure can be considered. According to the inert purge structure, the piping connector 250 is surrounded by a box 256 and a local exhaust is performed while supplying the inert gas. With such a structure, even when the gas leakage occurs from the O-ring, an entirety of the gas leaked from the O-ring is guided to the local exhaust. Thereby, the gas will not leak out of the box 256. However, when heating the first pipe 248 and the second pipe 249, the box 256 may hinder the heating of the first pipe 248 and the second pipe 249. Further, when constructing the box 256 from above a piping heater, there may be a problem in ensuring the airtightness. On the other hand, according to the present embodiments, since a box such as the box 256 shown in FIG. 9 is not used, it is possible to prevent a gas such as the harmful gas from leaking from the piping connector 250 while ensuring the airtightness without interfering with the heating of the pipes such as the first pipe 248 and the second pipe 249.

(3) OTHER EMBODIMENTS OF PRESENT DISCLOSURE (MODIFIED EXAMPLES)

Subsequently, modified examples of the leakage detection apparatus of the embodiments described above will be described in detail. In the following description of the modified examples, only portions different from those of the embodiments described above will be described in detail.

First Modified Example

Figure 10:
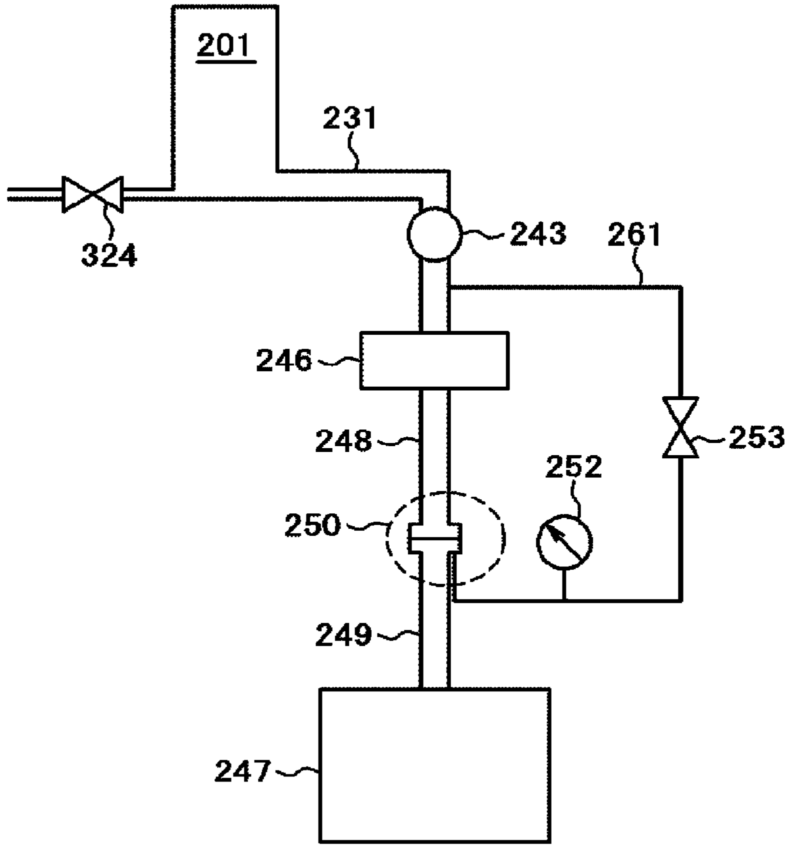
FIG. 10 is a diagram schematically illustrating a modified example of the exhauster according to the embodiments of the present disclosure.

In the present modified example, as shown in FIG. 10, a communication hole pipe 261 is provided instead of the communication hole pipe 251. One end of the communication hole pipe 261 is connected to the communication hole 249*d*, and the other end of the communication hole pipe 261 is connected to the intake side of the vacuum pump 246 installed at a front stage of the piping connector 250. Since the vacuum pump 246 is always in operation while the gas such as the harmful gas is flowing into the process chamber 201, the space 250*c* surrounded by the two O-rings 250*a* and 250*b* is depressurized (that is, in the reduced pressure state) by the vacuum pump 246 located upstream of the first pipe 248. Therefore, even when the gas leaks from the O-rings 250*a* and 250*b*, the gas is sucked (or exhausted) toward the space 250*c* in the reduced pressure state. Thereby, it is possible to prevent the gas leakage from the piping connector 250 to the outside.

Second Modified Example

Figure 11:
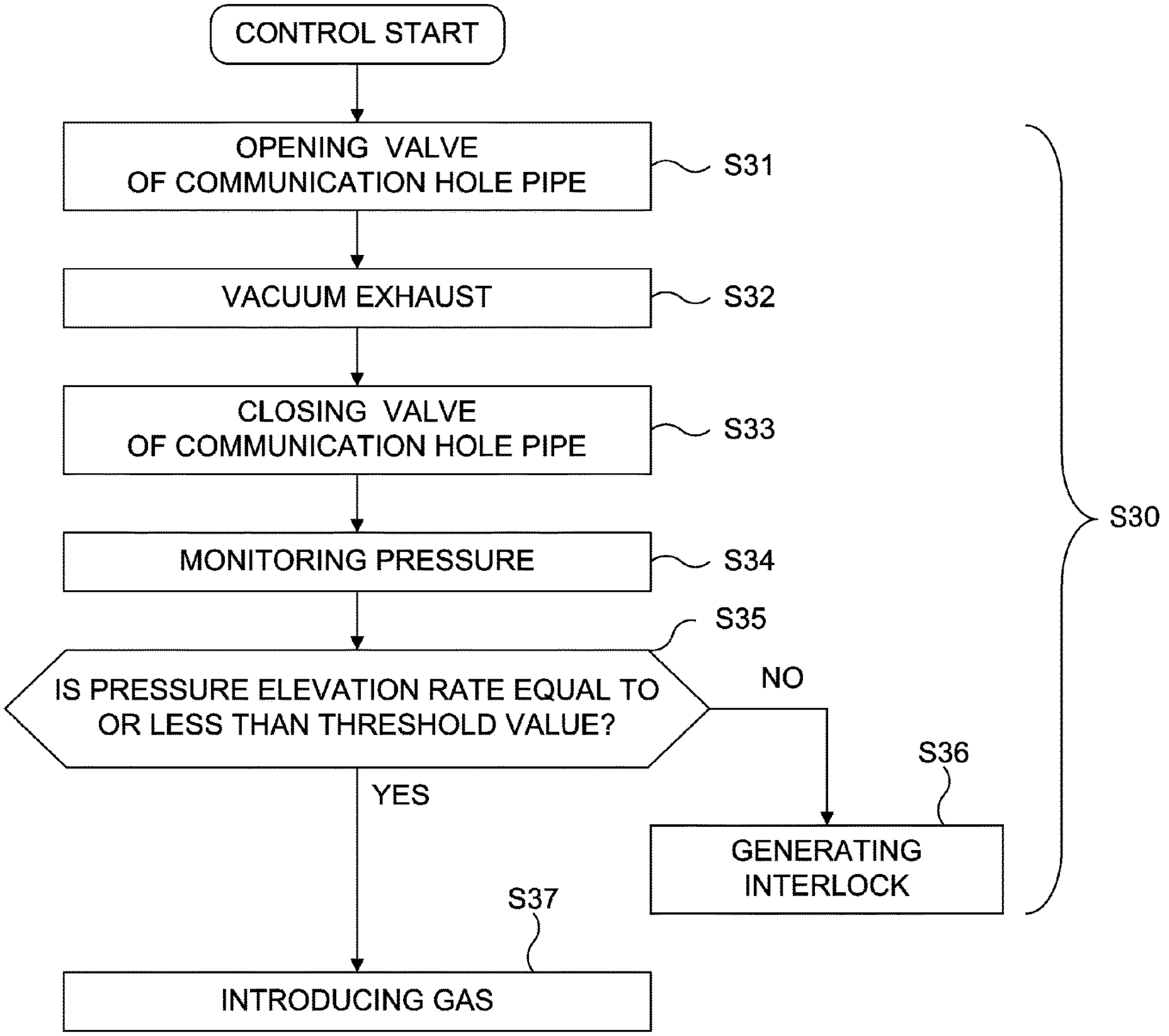
FIG. 11 is a flow chart schematically illustrating a modified example of the leakage detection process before the gas introduction according to the embodiments of the present disclosure.

As shown in FIG. 11, in a check before the gas introduction (step S30) of the present modified example, the valve 253 installed in the communication hole pipe 251 is opened (step S31), and the exhaust apparatus 254 vacuum-exhausts the space 250*c* surrounded by the two O-rings 250*a* and 250*b* to the reduced pressure state (step S32). Thereafter, the valve 253 installed in the communication hole pipe 251 is closed (step S33), and the pressure (inner pressure) of the space 250*c* is monitored by the pressure sensor 252 (step S34). Then, similarly to the step S23, a threshold value is set for the pressure elevation rate (pressure increase rate), and the presence or absence of the gas leakage is checked (step S35). When the pressure elevation rate is greater than the threshold value ("NO" in the step S35), it is determined that the gas leakage occurs, and an interlock is generated (step S36). When the pressure elevation rate is equal to or less than the threshold value ("YES" in the step S35), it is determined that there is no gas leakage. Then, the valve 324 is opened to introduce the gas (step S37). Since the gas leakage can be detected before the gas is introduced, it is possible to prevent the leakage of the gas such as the harmful gas.

For example, in the embodiments described above, the valve 253 installed in the communication hole pipe 251 may not be closed after the check before the gas introduction. That is, the step S15 described above may not be performed. For example, the valve 253 may be opened and the space 250*c* surrounded by the two O-rings 250*a* and 250*b* may be constantly sucked (or exhausted) by the exhaust apparatus 254. Thereby, as in the first modified example, even when the gas leaks, the gas is sucked (or exhausted) toward the space 250*c* in the reduced pressure state. Thereby, it is possible to prevent the gas leakage from the piping connector 250 to the outside.

For example, the embodiments described above are described by way of an example in which a vertical batch type substrate processing apparatus configured to simultaneously process a plurality of substrates is used to form the film. However, the technique of the present disclosure is not limited thereto. For example, the technique of the present disclosure may be preferably applied when a single wafer type substrate processing apparatus configured to process one or several substrates at a time is used to form the film. Even when such a substrate processing apparatus is used to form the film, process sequences and process conditions may be substantially the same as those of the embodiments described above.

It is preferable that the process recipe (that is, a program defining parameters such as the process sequences and the process conditions of the substrate processing) used to form the film is prepared individually in accordance with the contents of the substrate processing such as a type of the film to be formed, a composition ratio of the film, a quality of the film, a thickness of the film, the process sequences and the process conditions of the substrate processing. That is, a plurality of process recipes are prepared in advance. Then, when starting the substrate processing, an appropriate process recipe is preferably selected among the process recipes in accordance with the contents of the substrate processing. Specifically, it is preferable that the process recipes are stored (installed) in the memory 121*c* of the substrate processing apparatus in advance via an electric communication line or the recording medium (for example, the external memory 123) storing the process recipes prepared individually in accordance with the contents of the substrate processing. Then, when starting the substrate processing, the CPU 121*a* preferably selects the appropriate process recipe among the process recipes stored in the memory 121*c* of the substrate processing apparatus in accordance with the contents of the substrate processing. With such a configuration, various films of different types, different composition ratios, different qualities and different thicknesses may be universally formed with a high reproducibility using a single substrate processing apparatus. In addition, since a burden on an operator such as inputting the process sequences and the process conditions may be reduced, various processes can be performed quickly while avoiding a misoperation of the apparatus.

Further, the technique of the present disclosure may be implemented by changing an existing process recipe stored in the substrate processing apparatus to a new process recipe. When changing the existing process recipe to the new process recipe, the new process recipe according to the technique of the present disclosure may be installed in the substrate processing apparatus via the electric communication line or the recording medium storing the process recipes. Alternatively, the existing process recipe already stored in the substrate processing apparatus may be directly changed to the new process recipe according to the technique of the present disclosure by operating the input/output device of the substrate processing apparatus. The gas to be detected using the gas leakage detection described above is not limited to a general semiconductor process gas. For example, as the gas to be detected using the gas leakage detection described above, substances such as Class 1 designated chemical substances, Class 2 designated chemical substances and their derivatives (as stipulated in Japan's Act on Confirmation, etc. of Release Amounts of Specific Chemical Substances in the Environment and Promotion of Improvements to the Management Thereof) may be used.

The technique of the present disclosure is described in detail by way of the embodiments and the modified examples described above. However, the technique of the present disclosure is not limited thereto. The technique of the present disclosure may be modified in various ways without departing from the scope thereof.

According to some embodiments of the present disclosure, it is possible to reduce the gas leakage when processing the substrate.

What is claimed is:

1. A leakage detection apparatus comprising:

two exhaust pipes provided on a downstream side of a vacuum exhaust apparatus and connected to each other at flanges thereof;

two O-rings arranged between the flanges facing each other so as to seal an inside of each of the pipes from outside in a double seal manner;

a communication hole provided in one of the flanges and communicating with a space surrounded by the two O-rings;

a monitor pipe configured to provide direct fluid communication between the communication hole and an intake of the vacuum exhaust apparatus;

a pressure gauge connected to the monitor pipe and capable of measuring an internal pressure of the monitor pipe;

a valve configured to be opened and closed so as to fluidly connect the monitor pipe to the vacuum exhaust apparatus; and a controller configured to be capable of controlling an opening and closing operation of the valve so as to maintain a pressure measured by the pressure gauge within a predetermined pressure range lower than internal pressures of the pipes.

2. The leakage detection apparatus of claim 1, wherein the controller is configured to determine that a leakage occurs when at least one among the internal pressure measured by the pressure gauge, an elevation rate of the internal pressure and an opening time of the valve exceeds a threshold value related thereto.

3. The leakage detection apparatus of claim 2, wherein the controller is configured to monitor an elevation rate of an inner pressure of the space while the valve is closed, and is configured to generate an interlock when the elevation rate of the inner pressure of the space exceeds a threshold value related thereto.

4. The leakage detection apparatus of claim 3, wherein the controller is configured to open the valve and configured to reduce an inner pressure of the communication hole before closing the valve.

5. The leakage detection apparatus of claim 2, wherein the controller is configured to check for the leakage by checking whether an inner pressure of the space reaches a predetermined pressure or less within a predetermined time while the valve is opened, and is configured to generate an interlock when the leakage occurs.

6. The leakage detection apparatus of claim 5, wherein the controller is configured to open the valve when a continuous closing time of the valve exceeds a threshold value related thereto.

7. The leakage detection apparatus of claim 2, wherein, when the leakage occurs, the controller is configured to control to close a process gas supply valve through which a process gas to be exhausted by the vacuum exhaust apparatus is supplied.

8. The leakage detection apparatus of claim 1, wherein a harmful or flammable gas flows in the pipes, and wherein a detoxification apparatus is located downstream of the vacuum exhaust apparatus.

9. The leakage detection apparatus of claim 8, wherein the pipes are constituted by a first pipe and a second pipe, and wherein the first pipe and the second pipe are connected by making the flange related to the first pipe face the flange related to the second pipe, and wherein the detoxification apparatus is located downstream of the second pipe.

10. The leakage detection apparatus of claim 1, wherein the pipes are constituted by a first pipe and a second pipe, and wherein the first pipe and the second pipe are connected by making the flange related to the first pipe face the flange related to the second pipe, and wherein the detoxification apparatus is located downstream of the second pipe.

11. The leakage detection apparatus of claim 1, wherein at least one among the flanges facing each other is provided with grooves into which the two O-rings are fitted.

12. A substrate processing apparatus comprising:

the leakage detection apparatus of claim 1.

13. The leakage detection apparatus of claim 1, wherein a pressure inside each of the exhaust pipes is capable of becoming either higher than atmospheric pressure or lower than atmospheric pressure depending on a flow rate of a gas discharged by the vacuum exhaust apparatus.

14. A substrate processing method comprising:

(a) transferring a substrate into a substrate processing apparatus, wherein the substrate processing apparatus comprises:

two exhaust pipes provided on a downstream side of a vacuum exhaust apparatus and connected to each other at flanges thereof;

two O-rings arranged between the flanges facing each other so as to seal an inside of each of the pipes from outside in a double seal manner;

a communication hole provided in one of the flanges and communicating with a space surrounded by the two O-rings;

a monitor pipe configured to provide direct fluid communication between the communication hole and an intake of the vacuum exhaust apparatus;

a pressure gauge connected to the monitor pipe and capable of measuring an internal pressure of the monitor pipe; and a valve configured to be opened and closed so as to fluidly connect the monitor pipe to the vacuum exhaust apparatus; and (b) controlling an opening and closing operation of the valve so as to maintain the internal pressure measured by the pressure gauge within a predetermined pressure range lower than inner pressures of the pipes.

15. A method of manufacturing a semiconductor device, comprising the method of claim 14.

16. A non-transitory computer-readable recording medium storing a program that causes a substrate processing apparatus, by a computer, to perform the method of claim 14.

* * * * *